(12) United States Patent
Koketsu

(10) Patent No.: US 6,688,647 B2
(45) Date of Patent: Feb. 10, 2004

(54) THROUGH ANCHOR AND METHOD FOR MANUFACTURING THE SAME

(75) Inventor: Eiji Koketsu, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/046,892

(22) Filed: Jan. 17, 2002

(65) Prior Publication Data

US 2002/0093185 A1 Jul. 18, 2002

(30) Foreign Application Priority Data

Jan. 18, 2001 (JP) ........................................ 2001-010304

(51) Int. Cl.$^7$ .............................................. B60R 22/24
(52) U.S. Cl. ........................ 280/808; 297/483; 24/164; 24/198
(58) Field of Search ...................... 280/808; 297/483; 24/163 R, 164, 198, 199

(56) References Cited

U.S. PATENT DOCUMENTS

| | | | | |
|---|---|---|---|---|
| 6,138,328 A | * | 10/2000 | Iseki | ........................ 280/808 |
| 6,382,672 B1 | * | 5/2002 | Minami et al. | ............. 280/808 |
| 6,467,850 B1 | * | 10/2002 | Kawai et al. | ............... 297/468 |

FOREIGN PATENT DOCUMENTS

| | | | | |
|---|---|---|---|---|
| GB | 2255897 A | * | 11/1992 | .......... B60R/22/24 |
| JP | 10095308 A | * | 4/1998 | .......... B60R/22/24 |
| JP | 10-119718 | | 5/1998 | |
| JP | 2001-1861 | | 1/2001 | |

OTHER PUBLICATIONS

Search Report, United Kingdom, May 10, 2002, Application No. GB0201073.4.

* cited by examiner

*Primary Examiner*—Peter C. English
(74) *Attorney, Agent, or Firm*—Nixon Peabody, LLP

(57) ABSTRACT

In a seat belt device for an automobile, according to a through anchor of the present invention, a groove provides the boundary part between a molded part and a resin piece. Thereby, the boundary between the molded part and the resin piece is disposed inside the groove without conspicuousness. Moreover, a projection part of a mold for forming the groove is disposed between the synthetic resin materials comprising the resin piece and the molded part when molding the molded part. Accordingly, the heat of the molten synthetic resin material comprising the molded part is not transmitted directly to the resin piece on the surface of the through anchor.

13 Claims, 5 Drawing Sheets

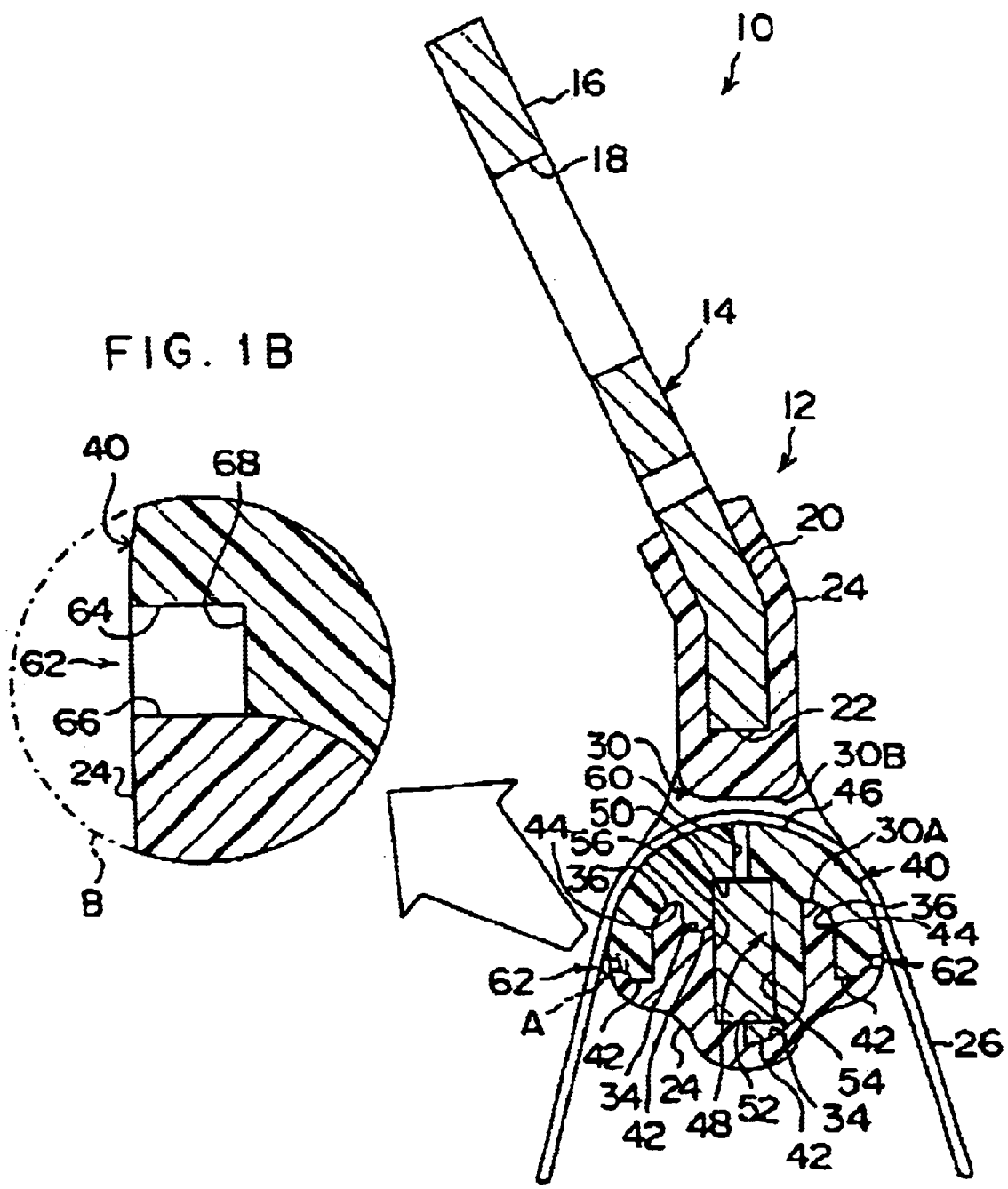

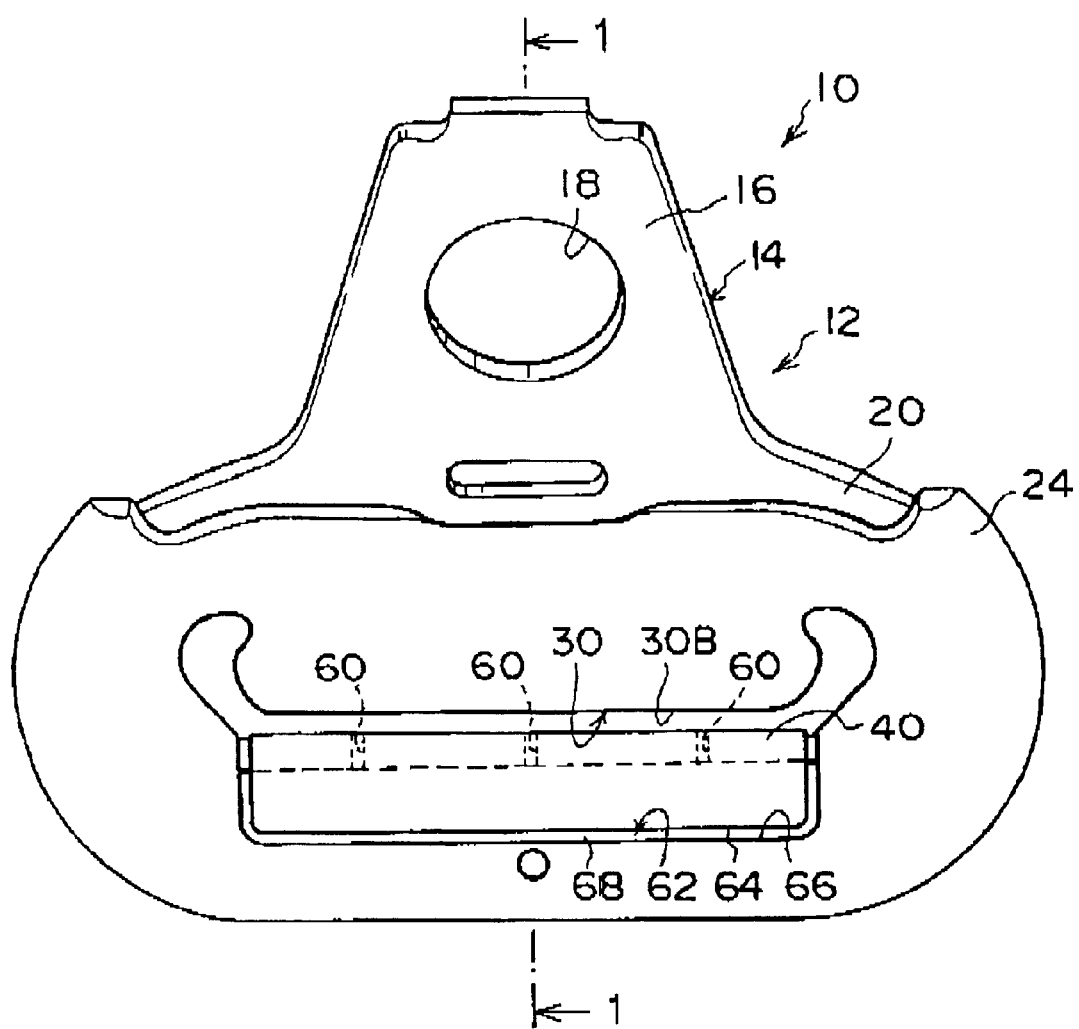

THROUGH ANCHOR AND METHOD FOR MANUFACTURING THE SAME

BACKGROUND OF THE INVENTION

1. Field of the Invention

The present invention relates to a through anchor used for a seat belt device for an automobile.

2. Description of the Related Art

A webbing belt comprising a seat belt device for binding the body of a passenger seated on a seat of an automobile has one end in the longitudinal direction stopped on a winding shaft of a winding device provided on for example, the side of the seat, and the other end fixed on an anchor plate provided in the vicinity of the winding device. Moreover, the middle part in the longitudinal direction of the webbing belt is folded back to the downward direction above the winding device, for example by being placed through an inserting hole formed in a through anchor at the upper end side of a center pillar of the automobile.

The webbing belt is placed through an inserting hole of a tongue plate between the fold back part in the through anchor and the other end so that the webbing belt wound on the winding shaft of the winding device can be taken out by pulling the tongue plate, and the webbing belt can be mounted by interlocking the tongue plate with a buckle device provided on the side opposite to the winding device with respect to the seat.

Moreover, the above-mentioned through anchor comprises a metal mandrel with an original hole for the inserting hole formed. The part of the mandrel other than the part to be fixed on the center pillar of the automobile is molded with a synthetic resin material. Since the molded part is provided also in the original hole inner circumferential part of the inserting hole, the webbing belt is slid with respect to the molded part.

In consideration of taking out the webbing belt smoothly from the winding device, and taking up the webbing belt smoothly on the winding device, it is preferable that the friction between the through anchor and the webbing belt is small. As a means for reducing the friction between the through anchor and the webbing belt, a method of forming a resin piece made of a synthetic resin material such as a polyacetal (POM), and a high molecular weight polyethylene corresponding to the inner circumferential part of the inserting hole of the through anchor to be slid against the webbing belt, and forming a molded part with another synthetic resin material such as a nylon, with the resin piece in the state mounted on the original hole of the mandrel set in a mold, is conceivable.

However, when forming the molded part with a nylon, with respect to the molding temperature of 240° C. at the time of molding, the melting point of the polyacetal is 165 to 175° C., and the melting point of the high molecular weight polyethylene is 136° C., and thus they are lower than the molding temperature. Therefore, since the resin piece made of the polyacetal or the high molecular weight polyethylene is melted or deformed at the time of molding, it has been extremely difficult to mold the molded part with the resin piece shape maintained.

SUMMARY OF THE INVENTION

In consideration of the circumstances, an object of the present invention is to obtain a through anchor capable of maintaining the good molding property and external appearance quality even when using a sliding member made of a synthetic resin material having a melting point lower than that the synthetic resin material providing the molded part, and a method for manufacturing such a through anchor.

According to a first aspect of the present invention, there is provided a method for manufacturing a through anchor comprising a mandrel made of a metal, a molded part made of a synthetic resin material, for covering the mandrel, with an inserting hole for inserting through a webbing belt formed, and a sliding member made of a synthetic resin material having a melting temperature lower than that of the synthetic resin material for forming the molded part, and a friction resistance of the external surface lower than that of the molded part, provided in the molded part corresponding to the sliding part of the inserting hole with respect to the webbing belt, comprising the steps of (a) forming a projecting part projecting from a cavity of a mold for molding the molded part, corresponding to the boundary part of the molded part and the sliding member on the external surface of the molded part and the sliding member, and (b) parting the sliding member and the synthetic resin material for forming the molded part injected in the mold by the projecting part in the vicinity of the external surface of the sliding member at the boundary part.

According to the method for manufacturing a through anchor of the above-mentioned configuration, the mandrel is set in the mold in the state with the sliding member mounted in a part corresponding to the sliding part of the through anchor with respect to the webbing belt in the mandrel. Then, the synthetic resin material is injected into the mold in this state. Thereby, the molded part is provided (hereinafter the synthetic resin material for forming the molded part is referred to as the "molding resin" for the explanation convenience in order to distinguish the synthetic resin material for forming the molded part and the synthetic resin material for forming the sliding member).

Although the molding resin has a melting point higher than that of the synthetic resin material for forming the sliding member, since the projecting part is formed from the cavity of the mold corresponding to the vicinity of the boundary part of the sliding member with respect to the molded part at the external surface in the state with the sliding member and the molded part integrated, the projecting part is provided between the boundary part with respect to the molded part at the external surface of the sliding member and the molten molding resin in the mold so that the boundary part of the molded part at the external surface of the sliding member and the molten molding resin can be parted by the projecting part.

Accordingly, since the boundary part with respect to the molded part at the external surface of the sliding member is not contacted directly with the molten molding resin in the mold, the heat of the molten molding resin is not directly transmitted to the boundary part with respect to the molded part at the external surface of the sliding member. Thereby, at least at the time of molding the molded part, the boundary part with respect to the molded part at the external surface of the sliding member can hardly be melted.

Moreover, since the sliding member has a part with the molten molding resin and the sliding member directly contacted, the heat can be conducted from the synthetic resin material comprising the molded part at the part so as to partially melt the sliding member. However, since the boundary part with respect to the molded part at the external surface of the sliding member is contacted with the projecting part, even if the heat of the molten molding resin is transmitted to the vicinity of the boundary part with respect to the molded part at the external surface of the sliding member, it is discharged to the contacted projecting part, and thus the melting and deformation of the boundary part with respect to the molded part at the external surface of the sliding member can effectively prevented or restrained.

Furthermore, a groove is formed along the boundary part of the sliding member and the molded part at the external surface of the sliding member and the molded part, which are integrated after molding, owing to formation of the projecting part in the mold, with a fixing part of the sliding member and the molded part exposed at the bottom end part of the groove. Although the synthetic resin comprising the sliding member and the molding resin are mixed at the fixing part, since the fixing part is disposed at the bottom or end part of the groove without being exposed at the external surface of the sliding member and the molded part, the fixing part can hardly be seen from the outside so that the external appearance quality of the through anchor can be improved.

It is preferable that the method of the first aspect of the present invention further comprises a step of forming a bole communicating the sliding surface side of the sliding member with respect to the webbing belt and the side opposite to the sliding surface side in the sliding member, wherein the gas generated from the synthetic resin material comprising the molded part injected into the mold is discharged from the hole.

According to the method for manufacturing a through anchor of the above-mentioned configuration, a hole communicating the sliding surface side with respect to the webbing belt and the side opposite to the sliding surface (that is, the fixing surface side with respect to the molded part) is formed in the sliding member so that the gas generated from the molding resin at the time of molding is discharged to the outside through the hole.

Accordingly, in the method for manufacturing the through anchor, the gas generated from the molten molding resin is not contained in the vicinity of the fixing part of the sliding member with respect to the molded part, or the like, or the possibility thereof is extremely low. Thereby, the so-called voids (bubbles) by the gas cannot be formed after finishing the molding, or the possibility of the formation thereof is extremely low, and thus the molding failure or deterioration of the fixing performance derived from the voids can be prevented or restrained.

According to a second aspect of the present invention, there is provided a through anchor comprising a molded part made of a synthetic resin material, for covering the mandrel, with an inserting hole for inserting through a webbing belt formed, and a sliding member made of a synthetic resin material having a melting temperature lower than that of the molded part, and a surface friction resistance lower than that of the molded part provided in the molded part corresponding to the sliding part of the inserting hole with respect to the webbing belt. Furthermore, a groove opened in the surface of the molded part and the sliding member, with the boundary part of the molded part and the sliding member disposed in the inside thereof, is formed.

According to the through anchor of the above-mentioned configuration, the mandrel made of a metal is covered with the molded part made of a synthetic resin so that the webbing belt is inserted through the inserting hole formed in the molded part. Therefore, by mounting the through anchor on a predetermined position of an automobile (such as a center pillar), directly or indirectly, the middle part in the longitudinal direction of the webbing belt is supported by the through anchor (more specifically, by the inner circumferential part of the inserting hole).

Moreover, in the through anchor, the sliding member is provided in the molded part. Since the sliding member is provided corresponding to the sliding part of the inserting hole with respect to the webbing belt, friction is generated between the sliding member and the webbing belt at the time of taking out the webbing belt from the winding device storing the webbing belt in the wound state, or at the time of taking up the webbing belt onto the winding device. However, since the surface of the sliding member has a friction resistance lower than that of the molded part, resistance to the webbing belt is small at the time of taking out or taking up, and thus the webbing belt can be taken out or taken up smoothly.

In the through anchor, the sliding member is made of a synthetic resin material having a melting temperature lower than that of the synthetic resin comprising the molded part.

In the boundary part of the molded part and the sliding member or in the vicinity of the boundary part, the groove opened in the surface of the molded part and the sliding member is formed. Thereby, even if the molded part is formed by injecting a molten synthetic resin into a mold for molding the molded part with the mandrel set therein and the sliding member mounted on the mandrel, the boundary part of the molded part and the sliding member can be disposed inside the groove.

Therefore, the part with the synthetic resins comprising the molded part and the sliding member melted and mixed at the boundary can be hidden inside the groove. Thereby, even if the molded part is formed with the sliding member mounted on the mandrel, the quality of the external appearance can be improved (in other words, the molded part can be molded with the mandrel set in the mold for molding the molded part and the sliding member mounted on the mandrel without deteriorating the neat external appearance or the molding property).

Furthermore, a projecting part needs to be formed in the mold for molding the molded part, corresponding to the groove in providing the groove. Therefore, the sliding member is not contacted directly with the molded part at the boundary part with respect to the molded part in the surface of the sliding member, and thus transmission of the heat from the molten synthetic resin material comprising the molded part can be restrained. Furthermore, the heat transmitted from the synthetic resin material comprising the molded part melted by the contact with the projecting part in the mold for forming the groove can be discharged to the mold. Thereby, inadvertent melting or deformation of the sliding member can be restrained or prevented, and thus the molding property can be improved also thereby.

In the through anchor of the second aspect of the present invention, it is preferable that a hole communicating the part contacted with the molded part and the side opposite to the contacted part is formed in the sliding member.

According to the through anchor of the above-mentioned configuration, the hole is formed in the sliding member such that the part of the sliding member contacted with the molded part and the side opposite to the contacted part is communicated by the hole. Thereby, at the time of molding the molded part by injecting the molten synthetic resin material with the mandrel set in the mold for molding the molded part and the sliding member mounted on the mandrel, a gas or a moisture content generated from the air or the molten synthetic resin material in the mold cannot be blocked by the sliding member. The gas or the moisture content is guided to the opposite side with respect to the part contacted with the molded part of the sliding member through the hole formed in the sliding member. Furthermore, the gas or the moisture content is discharged to the outside of the mold.

Thereby, even though the molded part is molded with the mandrel set in the mold for molding the molded part and the sliding part mounted on the mandrel, generation of the molding failure, such as the voids (bubbles), burning, burr, or the like at the molded part can be prevented or restrained. In other words, the molded part can be molded with the mandrel set in the mold for molding the molded part and the sliding part mounted on the mandrel without deteriorating the neat external appearance or the molding property.

BRIEF DESCRIPTION OF THE DRAWINGS

FIG. 1A is a cross-sectional view of a through anchor according to a first embodiment of the present invention, taken along the line 1—1 of FIG. 2.

FIG. 1B in the chain line circle B is an enlarged view of the part in the chain line circle A in FIG. 1A.

FIG. 2 is a plan view of the through anchor according to the first embodiment of the present invention.

DESCRIPTION OF THE PREFERRED EMBODIMENTS

Figure 3A:
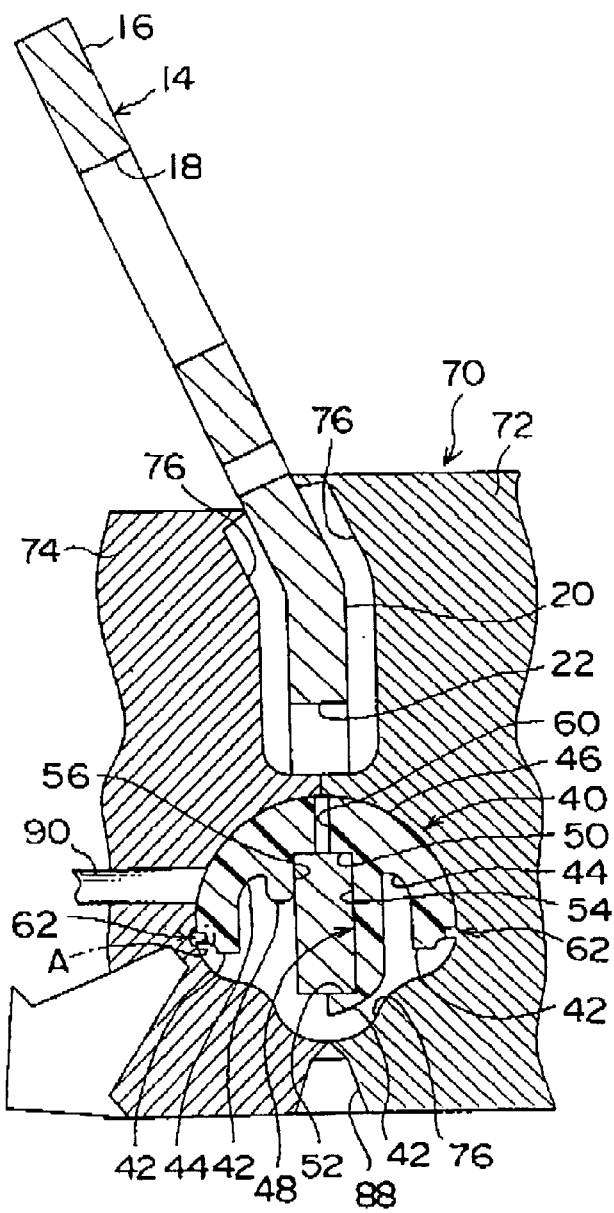
FIG. 3A is a cross-sectional view of the through anchor according to the first embodiment of the present invention in the state with the sliding member mounted on the mandrel, set in the mold for molding, corresponding to FIG. 1.
Figure 3B:
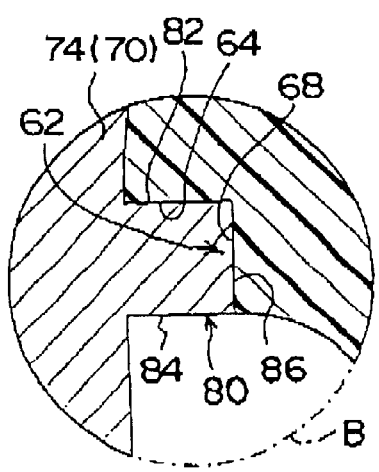
FIG. 3B in the chain line circle B is an enlarged view of the part in the chain line circle A in FIG. 3A.

FIG. 2 is a plan view of a through anchor 10 according to an embodiment of the present invention. FIG. 1A is a cross-sectional view of the through anchor 10. In the description below, the upper and lower directions and the right and left directions showing the orientation are the directions referred to in the state with the through anchor 10 mounted on an automobile.

The through anchor 10 comprises a mandrel 14 providing a through anchor main body 12. The mandrel 14 is made of a metal, formed in a plate-like shape as a whole. Moreover, the mandrel 14 is provided with a substantially trapezoidal base part 16. In the base part 16, a round hole 18 is formed through in the base part 16 thickness direction.

A mounting bolt (not shown) is inserted through the round hole 18. By fixing the mounting bolt on a center pillar of the automobile, or on a slider comprising a height adjusting device provided in the center pillar, the through anchor 10 can be mounted on the automobile.

Moreover, in the lower bottom part of the trapezoid with the base part 16 shape regarded as a trapezoid, an inserting plate part 20 comprising the mandrel together with the base part 16 is formed. The inserting plate part 20 is formed in a plate-like shape with the longitudinal direction disposed along the lower bottom part of the base part 16, bent with respect to the base part 16 such that the thickness direction is inclined by a predetermined angle with respect to the thickness direction of the base part 16. Moreover, an original hole 22 provided through in the thickness direction is formed in the inserting plate part 20.

The inserting plate part 20 is covered with a molded part 24. The molded part 24 is formed with a synthetic resin material such as a nylon (hereinafter the synthetic resin material comprising the molded part 24 will be referred to as the "molding resin" for the explanation convenience) so as to be thicker on the side opposite to the base part 16 of the inserting plate part 20. The molded part 24 is formed also in the inner circumferential part of the original hole 22 formed in the base part 16.

An inserting hole 30 is a long hole provided longitudinally along the longitudinal direction of the inserting plate part 20, for inserting through a webbing belt 26. Although it is not shown specifically in the figure, the webbing belt 26 is formed in a long band-like shape, with the flexibility provided in the entirety. Moreover, the base end part of the webbing belt 26 is stopped on the winding shaft of a winding device provided on the side of a seat. The tip end of another end part of the webbing belt 26 is fixed on an anchor plate provided in the vicinity of the winding device.

Moreover, the tip end side of the webbing belt 26 with respect to the part inserted through the inserting hole 30 is placed through a tongue plate provided engageable with a buckle device disposed on the side opposite to the winding device with respect to the seat. By taking out the webbing belt 26 from the winding shaft by pulling the tongue plate and engaging the tongue plate with the buckle device, the webbing belt 26 can be in the mounted state (in the description above, those without a numeral are not shown in the figure).

Furthermore, the molded part 24 covers the mandrel 14 such that the inserting plate part 20 of the mandrel 14 is projected from the inner circumferential lower part 30A in the inner circumferential part of the inserting hole 30. At the time, the inner circumferential lower part 30A is disposed relatively on the lower side in the inner circumferential part of the inserting hole 30 in the state with the through anchor 10 mounted on an automobile. Furthermore, in the inner circumferential lower part 30A, a recess part 34 and a projection part 36 are formed along the molded part 24 thickness direction. A projection part 42 and a recess part 44 are formed on the lower surface of a resin piece (or a sliding member). The projection part 42 is fitted in the recess part 34, and the recess part 44 is fitted on the projection part 36.

The resin piece 40 is made of a synthetic resin having a melting point lower than the melting point of the molding resin, and a friction coefficient of the surface smaller than the friction coefficient of the surface of the molded part 24. The resin piece 40 is made of, for example, a polyacetal (POM), a super high molecular weight polyethylene, or the like. The resin piece 40 upper surface is provided as a sliding surface 46. The sliding surface 46 is contacted with one surface in the thickness direction of the webbing belt 26 inserted through the inserting hole 30. Therefore, when the webbing belt 26 is taken out from the above-mentioned winding device, or taken up to the winding device, friction is generated between the sliding surface 46 and the webbing belt 26.

Moreover, the sliding surface 46 has a curved cross-sectional shape projecting toward the inner circumferential upper part 30B side of the inserting hole 30 facing the inner circumferential lower part 30A, with the sector-like open angle with the premise that the sliding surface 46 is the outer circumference set at 120° or more. Furthermore, the resin piece 40 is formed thick on the thickness direction both end sides. That is, the size difference between the outer surface of the resin piece 40 and the recess part 44 disposed on the thickness direction both end sides is set to be 1.5 mm or more.

In contrast, in the lower surface of the resin piece 40, that is, the side with a plurality of the recess parts 44 and the projection parts 42 formed, a fitting part 48 is formed. The fitting part 48 is formed between the two projection parts 42 along the resin piece 40 thickness direction. In the fitting part 48, an upper wall 50 and a lower wall 52 are formed facing with each other substantially along the automobile upper and lower direction in the state with the through anchor 10 mounted on an automobile as well as side walls 54, 56 are formed facing with each other substantially along the upper and lower direction in the automobile.

The distance between the upper wall 50 and the lower wall 52 is substantially same as (specifically, it is slightly larger than) the width size of the mandrel 14 at the lower side with respect to the original hole 22. Moreover, the distance between the side wall 54 and the side wall 56 is substantially same as (specifically, it is slightly larger than) the thickness size of the mandrel 14 at the lower side with respect to the original hole 22.

Furthermore, the side wall 54 is formed so as to connect one end part in the width direction of the upper wall 50 and the lower wall 52. The side wall 56 is connected with the other end part in the width direction of the upper wall 50, but it is not connected with the other end part in the width direction of the lower wall 52. The fitting part 48 is opened between the lower wall 52 side end part of the side wall 56 and the lower wall 52. Therefore, the resin piece 40 can be mounted on the mandrel 14 in the lower side part with respect to the original hole 22 from the opening between the lower wall 52 and the side wall 56.

In the state with the resin piece 40 mounted on the mandrel 14, the mandrel 14 interferes with the upper wall 50, the lower wall 52, and the side walls 54, 56 so as to limit displacement of the resin piece 40 with respect to the mandrel 14.

Moreover, in the resin piece 40, three degassing holes 60 are formed as a hole. Each degassing hole 60 is formed longitudinally substantially along the upper and lower direction, with the upper end part thereof opened in the sliding surface 46 and the lower end part opened in the surface opposite to the sliding surface 46. That is, in this embodiment, the lower end part of the degassing holes 60 is opened in the surface facing the inner circumferential part of the original hole 22 of the mandrel 14.

Figure 4:
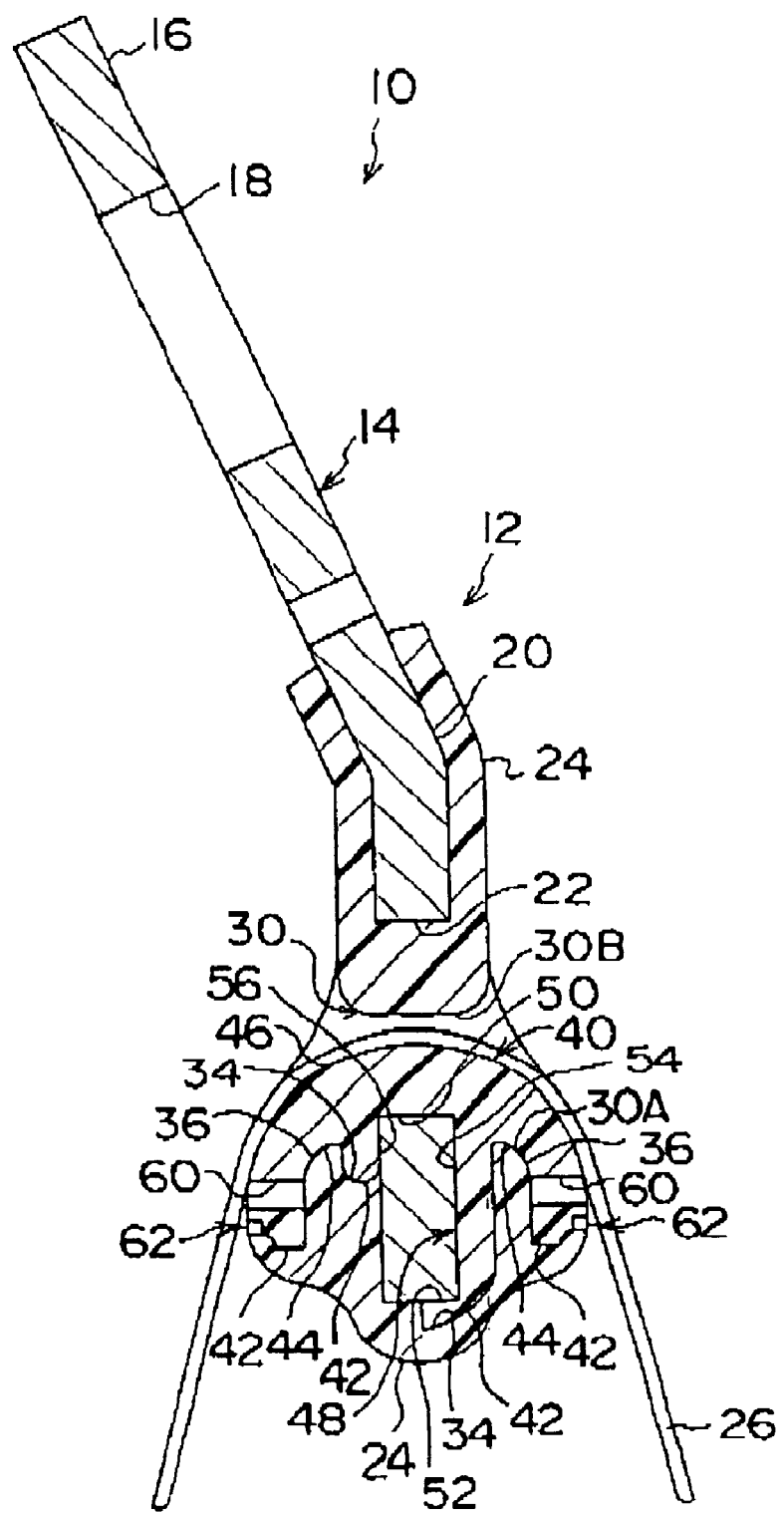
FIG. 4 is a cross-sectional view showing a modified example of a hole (degassing hole) corresponding to FIG. 1A.

Although the three degassing holes 60 are formed in the resin piece 40 in this embodiment, the number of the degassing holes 60 can be one, two, or four or more. Moreover, although the degassing holes 60 are provided longitudinally substantially along the upper and lower direction in this embodiment, the shape of the degassing holes 60 is not limited thereto. As long as one end of the degassing holes 60 is opened in the sliding surface 46 and the other end thereof is opened in the surface opposite to the sliding surface 46, for example, the degassing holes 60 can be provided longitudinally in the right and left direction (mandrel 14 thickness direction) as shown in FIG. 4.

In contrast, as shown in the circle B (FIG. 1B) as an enlarged view of the chain line circle A of FIG. 1A, in the through anchor 10, a groove 62 is formed along the boundary part between the resin piece 40 and the molded part 24. The groove 62 comprising side walls 64, 66 and an end wall 68 is formed along the boundary part between the resin piece 40 and the molded part 24 so as to be opened in the surface of the through anchor 10.

The side wall 64 comprising the groove 62 formed in the resin piece 40 comes in contact with an upper wall 82 and a tip end part 86 of a projecting part 80 formed projecting from the cavity 76 of a fixed mold 72 and a movable mold 74 comprising a mold 70 shown in FIG. 3A at the time of molding the molded part 24. In contrast, the side wall 66 of the groove 62 formed in the molded part 24 is formed by the existence of the lower wall 84 of the projecting part 80.

Accordingly, since the side wall 64 and the end wall 68 of the groove 62 are formed in the resin piece 40, and the side wall 66 is formed in the molded part 24, the boundary between the molded part 24 and the resin piece 40 on the surface side of the through anchor 10 can be provided at the corner between the end or bottom wall 68 and the side wall 66 of the groove 62, or in the vicinity thereof.

Next, the operation and the effect of this embodiment will be explained by referring to the resin piece 40 assembly step to the molding step of the molded part 24 (essential part of the method for manufacturing the through anchor 10) in the manufacturing step of the through anchor 10.

As to the mandrel 14 and the resin piece 40 each molded in a predetermined shape, the resin piece 40 is mounted on the mandrel 14 in the resin piece 40 assembly step. As mentioned above, the mounting operation is executed by inserting the lower side part with respect to the original hole 22 of the mandrel 14 from the opening between the side wall 56 and the lower wall 52 of the resin piece 40.

Next, as shown in FIG. 3A, the mandrel 14 with the resin piece 40 mounted is set at a predetermined position of the cavity 76 formed in the fixed mold 72 of the mold 70. Furthermore, in the set state, the mold 70 is closed by moving the movable mold 74 comprising the mold 70 together with the fixed mold 72. A molten nylon resin as the molding resin is injected into the cavity 76 of the mold 70 from a sprue (resin injecting opening) 88 formed in the mold 70. By cooling down and hardening the nylon resin in this state, the molded part 24 can be formed.

In the state with the molten nylon resin injected in the mold 70, a gas, or the like may be generated from the nylon resin. As it is observed in the related art, when the gas remains as it is in the nylon resin or between the nylon resin and the resin piece 40, the so-called "voids (bubbles)" are formed after molding.

In this embodiment, the gas generated from the nylon resin ascends in the molten nylon resin and passes through between the mandrel 14 and the resin piece 40. Thereafter, it is released to the upper end side of the degassing holes 60 through the degassing holes 60 formed in the resin piece 40. Furthermore, the gas is discharged to the outside of the mold 70 from a degassing pin 90 provided in the mold 70 through between the cavity 76 and the resin piece 40. Accordingly, in this embodiment, since storage of the gas generated from the molten nylon synthetic resin material in the nylon resin or between the nylon resin and the resin piece 40 can be prevented or alleviated, generation of the voids (bubbles) can be prevented or alleviated. Moreover, the temperature of the molten nylon resin in the mold 70 is set to be about 240° C. In contrast, the melting point of the resin piece 40 (that is, the melting point of the polyacetal) when the resin piece 40 is made of a polyacetal (POM) is from 165° C. to 175°

C. The melting point of the resin piece 40 (that is, the melting point of the super high molecular weight polyethylene) when the resin piece 40 is made of a super high molecular weight polyethylene is about 136° C. In any case, it is sufficiently lower than the melting point of the nylon resin.

Therefore, in the contact part of the resin piece 40 with the nylon resin (that is, the part to be the molded part 24 after hardening), the resin piece 40 is melted so as to be mixed with the nylon resin. Thereby, the resin piece 40 and the molded part 24 are integrated after hardening of the nylon resin.

In this embodiment, the projecting part 80 is formed projecting from the cavity 76 of the mold 70. The nylon resin is injected into the mold 70 so as to be hardened according to the shape of the cavity 76 including the projecting part 80. Then, the above-mentioned groove 62 is formed on the surface of the through anchor 10.

As mentioned above, the boundary between the molded part 24 and the resin piece 40 is formed on the surface side of the through anchor 10 between the side wall 66 and the bottom wall 68 comprising the groove 62 or in the vicinity thereof. That is, the boundary between the molded part 24 and the resin piece 40 is formed in the inside of the groove 62.

Therefore, the boundary between the molded part 24 and the resin piece 40 is not exposed remarkably on the surface side of the through anchor 10. Accordingly, even if the nylon resin and the molten resin piece 40 are mixed at the time of molding the molded part 24, the mixed part cannot be seen from the outside. Therefore, even if the resin piece 40 is made of a synthetic resin material having a melting point sufficiently lower than the melting point of the synthetic resin material comprising the molded part 24, the external appearance quality of the through anchor 10 can be maintained or improved.

Moreover, the heat of the molten nylon resin is transmitted from the contact part with the resin piece 40 to the resin piece 40 at the time of molding the molded part 24. On the through anchor 10 surface side, the resin piece 40 is contacted with the upper wall 82 and the tip end part 86 of the projecting part 80 so that the projecting part 80 is disposed between the resin piece 40 and the molten nylon resin. Thereby, the heat of the nylon resin cannot be transmitted directly to the resin piece 40. Besides, the molten nylon resin temperature is about 240° C. whereas the mold 70 temperature remains at about 80° C. Since the temperature of the mold 70 is sufficiently lower than the melting point of the synthetic resin material comprising the resin piece 40, the resin piece 40 cannot be melted on the surface of the through anchor 10. Accordingly, the external appearance quality of the through anchor 10 can be maintained or improved.

Furthermore, the resin piece 40 is contacted with the upper wall 82 of a projecting part 80 at the groove 62 part. When the heat of the molten nylon resin is transmitted from the center side of the through anchor to the vicinity of the groove 62 of the resin piece 40, it is discharged from the resin piece 40 to the projecting part 80. Accordingly, melting of the resin piece 40 at the surface of the through anchor 10 can be prevented or alleviated effectively so that the external appearance quality of the through anchor 10 can be maintained or improved.

Moreover, in this embodiment, the opening angle of the sector shape with the sliding surface 46 regarded as the outer periphery is set to be 120° or more. At the time of molding the molded part 24, the sliding surface 46 is contacted with the cavity 76 of the mold 70 by the length corresponding to the opening angle. Therefore, since the heat transmitted from the molten nylon resin to the resin piece 40 can be discharged to the mold 70 also from the cavity 76 part in contact with the sliding surface 46, melting of the resin piece 40 at the surface of the through anchor 10 can be prevented or alleviated effectively even at a part other than the vicinity of the part with the groove 62 formed. Accordingly, the external appearance quality of the through anchor 10 can be maintained or improved.

Furthermore, in this embodiment, the thickness of the resin piece 40 in the thickness direction both end sides is 1.5 mm or more. According to the shape, deformation of the resin piece 40 on the surface side of the through anchor 10 by the heat from the molten nylon resin can be prevented effectively.

Figure 5A:
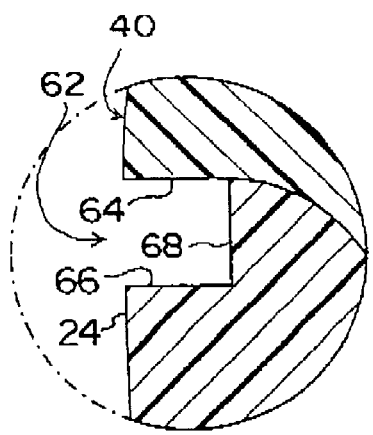
FIG. 5A is a diagram showing another aspect of the groove, corresponding to the chain line circle B in FIG. 1B.
Figure 5B:
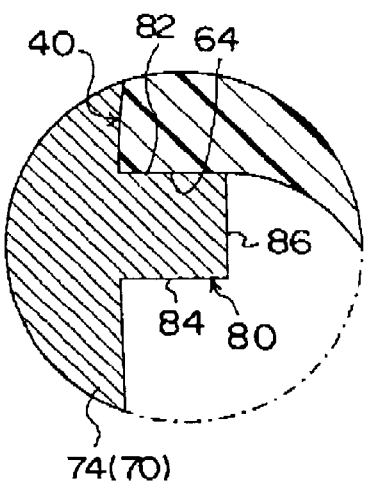
FIG. 5B is a diagram showing another aspect of the groove, corresponding to the chain line circle B in FIG. 3B.
Figure 6A:
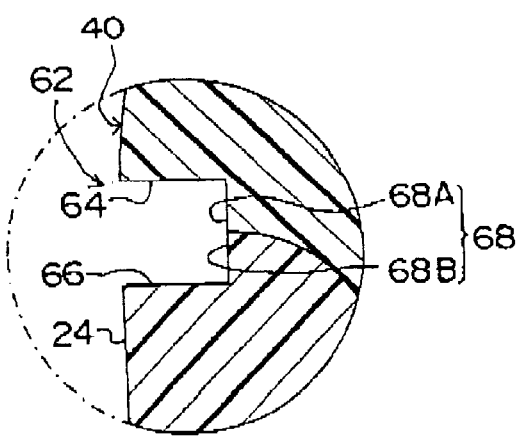
FIG. 6A is a diagram showing another aspect of the groove, corresponding to the chain line circle B in FIG. 1.
Figure 6B:
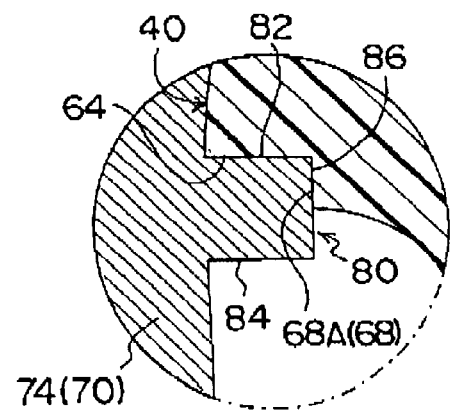
FIG. 6B is a diagram showing another aspect of the groove, corresponding to the chain line circle B in FIG. 3B.

Although the bottom wall 68 of the groove 62 is formed in the resin piece 40 in this embodiment, it is also possible to form the bottom wall 68 in the molded part 24 as shown in FIG. 5A and FIG. 5B. Or it is also possible to form the bottom wall 68 with a bottom wall 68A formed in the resin piece 40 and a bottom wall 68B formed in the molded part 24 (that is, the bottom wall 68 is formed both in the resin piece 40 and the molded part 24) as shown in FIG. 6A and FIG. 6B.

As heretofore explained, the present invention can maintain or improve the molding property when using a sliding member made of a synthetic resin material having a melting point lower than that of the synthetic resin material comprising the molded part. Thereby, the external appearance quality of the through anchor can be maintained or improved by the present invention.

What is claimed is:

1. A through anchor comprising:
    a mandrel made of a metal;
    a molded part made of a synthetic resin material, for covering the mandrel, and formed with an inserting hole for receiving a webbing belt; and
    a sliding member made of a synthetic resin material having a melting temperature lower than that of the molded part, and a surface friction resistance lower than that of the molded part, the sliding member provided in the molded part and forming a sliding part of the inserting hole on which the webbing belt slides,
    a groove formed in an outer surface of at least one of the molded part and the sliding member, said groove having first and second side walls formed by said molded part and said sliding member, respectively, with a boundary between the molded part and the sliding member being disposed in an inner portion of said groove.

2. A through anchor according to claim 1, wherein the sliding member has a hole communicating a portion thereof in contact with the molded part and an opposite portion thereof.

3. A through anchor according to claim 2, wherein the groove has an end wall, and the end wall of the groove is disposed in the molded part.

4. A through anchor according to claim 2, wherein the groove has a an end wall, and the end wall of the groove is disposed in the sliding member.

5. A through anchor according to claim 2, wherein the groove has an end wall, and the end wall of the groove is disposed in both the sliding member and the molded part.

6. A through anchor according to claim 1, wherein the sliding member has a fitting part, the fitting part has an upper wall and a lower wall facing each other, and the distance between the upper wall and the lower wall is substantially the same as the width of a predetermined part of the mandrel.

7. A through anchor according to claim 1, wherein the sliding member has a fitting part, the fitting part has a pair of side walls facing each other, and the distance between the side walls is substantially the same as the thickness of a predetermined part of the mandrel.

8. A through anchor for a seat belt device for an automobile comprising:
   a mandrel made of a metal;
   a molded part made of a synthetic resin material, for covering the mandrel;
   a sliding member made of a synthetic resin material having a melting temperature lower than that of the molded part, and a surface friction resistance lower than that of the molded part, the sliding member provided in the molded part; and
   a groove formed in an outer surface of at least one of the molded part and the sliding member, and having first and second spaced apart side walls formed by said molded part and said sliding member, respectively, and an end wall, with a boundary between the molded part and the sliding member disposed in an inner portion of said groove.

9. A through anchor according to claim 8, wherein the sliding member has a hole communicating a portion thereof in contact with the molded part and an opposite portion thereof.

10. A through anchor according to claim 9, wherein the sliding member has a sliding surface on which one surface of a belt of the seat belt device slides, and a lower surface formed with a plurality of recesses and projections, wherein a portion of the lower surface forms a fitting part for an upper portion of the molded part.

11. A through anchor according to claim 8, wherein the end wall of the groove is disposed in the molded part.

12. A through anchor according to claim 8, wherein the end wall of the groove is disposed in the sliding member.

13. A through anchor according to claim 8, wherein the end wall of the groove is disposed in both the sliding member and the molded part.

\* \* \* \* \*